Oct. 19, 1948.  M. GARBUNY ET AL  2,451,938
VAPOR ELECTRIC DEVICE
Filed Oct. 23, 1947
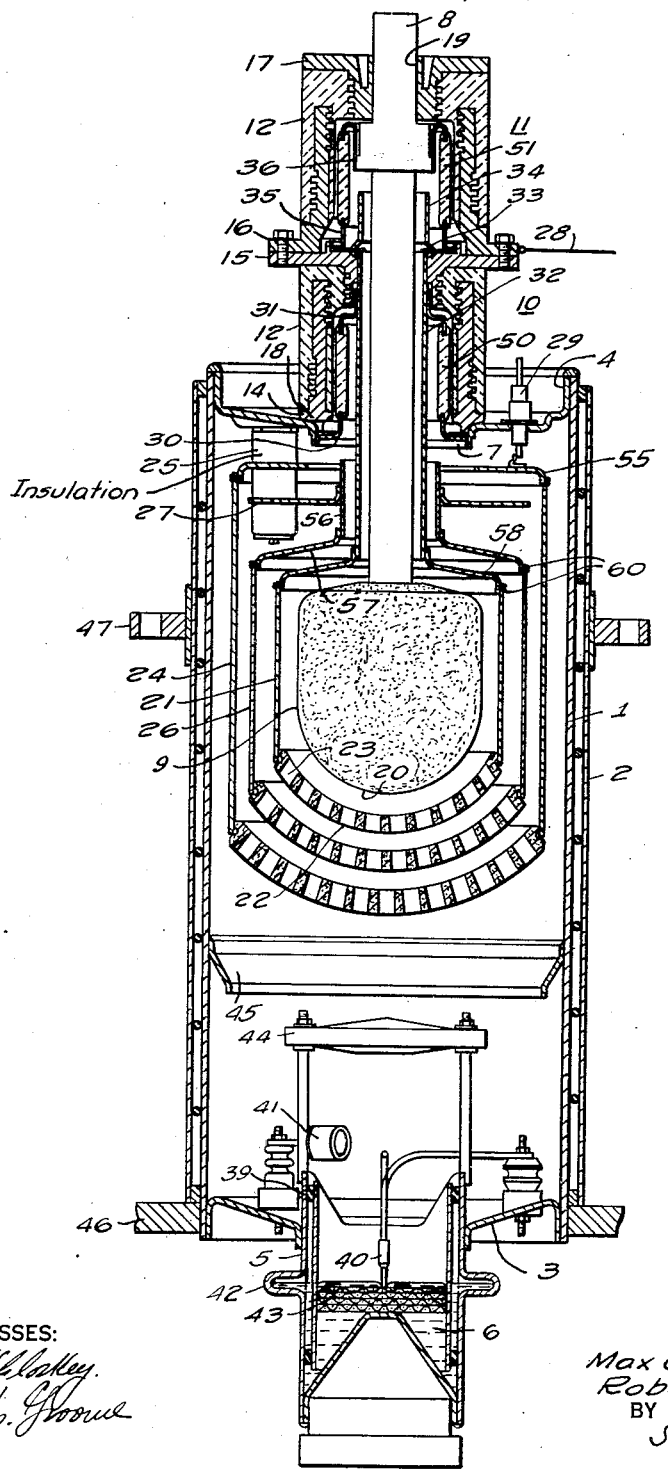
WITNESSES:
INVENTORS
Max Garbuny and
Robert E. Hull.
BY
S. A. Strickett
ATTORNEY Patented Oct. 19, 1948

2,451,938

UNITED STATES PATENT OFFICE 2,451,938

VAPOR ELECTRIC DEVICE

Max Garbuny and Robert E. Hull, Pittsburgh, Pa., assignors to Westinghouse Electric Corporation, East Pittsburgh, Pa., a corporation of Pennsylvania Application October 23, 1947, Serial No. 781,638

9 Claims. (Cl. 250—27.5)

Our invention relates to a vapor electric device, and particularly to a device subject to vibration or shock.

In a normal application of vapor electric devices, the valve elements are usually mounted on relatively stable or immovable platforms. However, when vapor electric devices are utilized on moving vehicles, such as locomotives and ships, serious difficulties are experienced because of vibration or shock which may be applied through the mountings to the construction of the tubes themselves. The vibration may not only affect the stability of the cathode materials, but may damage the elements which are normally supposed to be unaffected by operation.

For example, the insulating and vacuum-proof seals may be easily cracked by the vibration or shock applied to the vehicle, as by contact of a locomotive with a string of standing cars or the explosion of a mine or torpedo against the hull of a vessel. Not only are the seals apt to be damaged, but it has been found that the pendulous mass of some of the electrodes tends to cause displacement of the electrodes so that they may come in contact with each other, or with some portion of the container, or even become loosened in their mountings.

It has heretofore been proposed to utilize a heavy insulating bushing composed of a composition of mica and lead-borate glass to mount the anode stems in vapor electric devices. However, such devices have proved inadequate, as it has been found substantially impossible to produce such devices having a desired vacuum tightness. Also, it has been proposed to utilize glass-metal seals in which relatively thin metal collars are sealed into the ends of glass cylinders to provide a seal around the electrode bushings of vapor electric devices. Such seals are totally inadequate when shock or vibration is encountered.

We have discovered that these two types of seals or bushings may be utilized together, to provide a highly satisfactory shockproof seal and bushing. A relatively stable and mechanically strong composition bushing is utilized to mechanically support various of the electrode elements; while the glass-metal seal is resiliently mounted within the heavier bushing and protected thereby so that the glass-metal sealing element maintains the desired vacuum tightness while the composition bushing maintains the electrodes in a desired and fixed position.

The use of mechanical and vacuum seals in parallel has a further advantage in that the overall length can be greatly reduced because of the removal of mechanical stress from the vacuum-proof insulator.

It is, accordingly, an object of our invention to provide an improved bushing assembly for a vapor electric device.

It is a further object of our invention to provide a lead-in construction in which the electrodes are rigidly held in the desired position.

It is a further object of our invention to provide a composite seal and supporting structure for a vapor electric device.

It is a further object of our invention to provide a vapor electric device operable under severe conditions of stress or shock.

Other objects and advantages of our invention will be apparent from the following detailed description, taken in conjunction with the accompanying drawing, in which the figure is a sectional elevation of a vapor electric valve embodying our invention.

In the exemplary embodiment of our invention, an envelope is comprised of a substantially cylindrical element 1 to which is applied a suitable cooling jacket 2 and the ends of which are composed of inserted headers 3 and 4. The bottom header 3 of the envelope is provided with a cathode cup 5 for containing a liquid vaporizable cathode material 6 such as mercury, while the top header 4 is provided with an opening 7 through which an anode stem 8 extends to support an anode 9 in cooperative relation to the pool-type cathode 6.

The anode stem 8 is supported by means of a combination seal and bushing connected to the header 4 and to the outermost end of the anode stem 8. Preferably, the mechanically strong bushing is composed of a plurality of sections 10 and 11, each section 10 and 11 having an insulating body 12 which may conveniently be composed of a composition of mica and glass, which is available at present under the trade-name Micalex. The insulating bodies 12 are connected to metal ends 14, 15, 16 and 17 which are preferably connected to the mica-glass composition 12 by means of a hot molding operation and, if necessary, machined to shape after molding. The lowermost section 14 has a metallic terminal 18 which interfits with the opening 7 in the header 4 of the envelope and is mechanically attached thereto, preferably by welding.

The outermost end of the outer segment 11 of the bushing is provided with a metal terminal 17 which has an opening 19 therein forming a relatively tight fit with the exterior end of the anode lead 8 and is connected thereto, usually by means of a weld. The abutting or intermediate ends 15—16 of the mechanically strong bushing are provided with collars or flanges so that the parts of the bushing may be rigidly bolted together.

While we have shown preferred terms of inserts 14, 15, 16 and 17, it is obvious that these inserts may take any desired form and that various forms of fasteners may be utilized to secure the intermediate inserts 15 and 16.

The anode stem 8 supports an anode 9, preferably constructed of graphite and having a working face 20 which is a segment of a sphere in order to have a maximum working area in the smallest diameter of anode 9. Immediately surrounding the anode 9 is an anode shield 21, the operating portion 22 of which is preferably composed of graphite and is a spherical section to conform closely to the shape of the anode face 20. This graphite section 22 is provided with a relatively large number of relatively small openings 23 so that the maximum amount of opening in the shield 21 is provided without mechanically weakening the shield face 22 more than is absolutely necessary. The anode shield 21 not only conforms in shape to the anode 9, but extends along the major portion of the anode lead 8 and is supported intermediate the length of the bushing by a tight mechanical bearing on one or more of the intermediate inserts 15 or 16.

Preferably, a plurality, for example three, shields are utilized about the anode 9, the outside shield 24 being relatively close to the envelope and being rigidly supported by a plurality of insulators 25 attached to the header 4. The intermediate shields 26 may likewise be supported on the insulating bushings 25 by means of flanges 27 engaged on the insulators 25. All of the shields 21, 24 and 26 are preferably provided with substantially cylindrical metal portions and spherical sections of graphite for working faces. The inner shield 21, being connected directly to one of the intermediate inserts such as 15, is provided with a convenient method of applying potential by simply connecting the potential lead 28 to the insert 15. Where more than two sections of the insulating bushing are utilized, one or more of the interior shields 26 may be similarly mounted and similarly connected to any suitable source of supply. The external shield 24 is preferably connected to a control potential by means of an insulating bushing 29 inserted through an opening in the header. Obviously, one or all of the shields could be similarly connected.

A composition bushing, because of its mechanical strength and relatively large bearing surfaces, is capable of supporting the anode 9 and the inner shield 21 in rigid spaced relationship so that vibration of the container is not apt to produce contact between the shield 21 and the anode 9. Likewise, the rigid mounting to the header and the relatively short moment arms secured thereby, supports the intermediate and outer shields 24 and 26 so that vibration will not produce contact between the electrode members.

Where it is desired to reduce the length of the bushing to a minimum, the outer surface of the insulating bodies 12 may be provided with ridges or grooves in a known manner to increase the surface distance while the space between the supporting bushing and the vacuum seal is filled with an electronegative gas or a fluid of high electric breakdown strength.

In order to produce the suitable vacuum tightness to the bushing, inner vacuum-tight seals comprising a plurality of metal collars and a glass cylinder sealed between them is applied between the header 4 and the electrode stem 8. The first such seal has one of its collars 30 attached by welding directly to the header 4, while the inner collar 31 of the seal is welded in vacuum-tight relation to that portion 32 of the inner shield 21 extending upwardly along the anode stem 8. The inner shield 32 is then welded in vacuum-tight relation to the intermediate insert 15 in the mechanical bushing, and preferably it is cut off at this point so that a firm and satisfactory weld 33 may be accomplished. The upper portion 34 is then tack-welded in place. The second section of the vacuum seal is made between the intermediate insert 15 and the anode lead 8 itself, one of the metal collars 35 being welded to the metallic insert 15 and the other collar 36 being welded to the electrode lead 8.

The cathode assembly is preferably of the deep-dish variety, the dish 5 having a top edge 39 contoured so that inclination of the tube does not spill the cathode material 6 out of the cathode cup 5. A plurality of make-alive electrodes 40, one of which is shown, are usually provided for initiating the cathode spot. If desired, keep-alive electrodes 41 may be provided for maintaining the cathode spot for a predetermined interval after its initiation. The cathode dish 5 is usually provided with an enlargement 42 adjacent the normal working position so that any cathode material which is evaporated to provide the working vapor of the device will not unduly lower the level of the cathode material 6 in the cathode cup 5.

Preferably, the cathode cup 5 is substantially filled with wire mesh 43 of a fineness such that mercury will slowly flow through it, but which is substantially impervious to rapidly moving mercury. Preferably, a cathode shield 44 is mounted directly above the cathode cup 5 in order to prevent direct motion of cathode material 6 from the cathode into the vicinity of the anode 9 and shield electrodes 21—24—26. Also, in order to prevent mercury from travelling up the sides of the container, a baffle 45 ring is provided intermediate the anode and cathode region. While we have shown the cathode baffle 44 as being mounted on the cathode dish 5, in many instances we have found it desirable to mount the cathode baffle 44 on the baffle ring 45 so that they form a substantially integral construction.

In order to prevent vibration of the tube itself, we provide a mounting 46 at or adjacent the cathode and a second mounting 47 at or adjacent the anode level, so that the envelope itself is rigidly mounted and not subject to vibration.

In the construction of a device according to our invention, a relatively large number of subassemblies are produced and these eventually assembled to produce a complete valve. The cylindrical portion 1 of the envelope is provided with a water-jacket 2, and mounting means 46 and 47, while the intermediate flow baffle 45 is inserted in the proper position and welded in place. The cathode header 3 is then completely assembled with the cathode dish 5 and its adjuncts, together with the various lead-in insulators and supports for the make-alive electrodes 40, and, if desired, the keep-alive electrode 41 and the entire header 3 inserted as a unit and welded in place.

The segments 10—11 of the bushing as indicated above preferably being formed of metal inserts and a composition body by hot molding and, if necessary, final machining to the desired shape. The various vacuum seal elements, that is, the glass collars 50—51 and the relatively thin metal collars 30—31; 35—36, are constructed and utilized as units. The lower vacuum seal 31 is then welded to the tubular portion 32 of the inner shield 21, which tubular portion 32 is then inserted in the metal intermediate insert 15 of the mechanical bushing and preferably fusion-welded in place so as to provide a vacuum-tight connection 33 between the inner shield 21 and the intermediate insert 15, also a vacuum-tight weld between the inner shield 21 and the upper collar 31 of the lower vacuum bushing. The lower collar 30 is then fusion-welded to the edge of the opening 7 in the header 4 so that the header 4 and lower sections of both the mechanical and vacuum bushings are in a unitary piece.

The upper end 34 of the inner shield is then tack-welded in place. If desired, the portion 34 can be spun out so that it may be welded without danger of interfering with the first vacuum-tight weld 33. The upper metal collar 36 of the second seal is then welded to the lead-in stem 8 which is then inserted through the tubular portion 32 of the inner shield 21 and the lower collar 35 welded in vacuum-tight relation to the intermediate insert 15. The exterior portion 11 of the mechanical bushing is then inserted over the lead-in stem 8 and the meeting intermediate sections bolted or otherwise secured together and the exterior insert 17 welded or otherwise secured to the lead-in stem 8. In this manner, there is a direct mechanical support for both the inner shield 21 and the lead-in stem 8, with its anode 9.

The entire assembly is then inverted and the upper flange 55 of the outer shield 24 is connected to the header 4 and, if desired, to the potential lead-in 29. The supporting flange 27, the tubular section 56 and top section 57 of the intermediate shield 26 are then put in place and secured on the insulating bushings 25. The top portion 58 of the inner shield 21 is then attached to and welded securely to the tubular portion 32 of the shield 21, after which the anode 9 is attached to the anode stem 8. The cylindrical portion and working face 22 of the inner shield are then attached to the upper portion 58 of the shield, preferably by means of screw-threaded fastenings 60 which are then spot-welded to prevent loosening by vibration. The intermediate shield 26 with its working face is then attached in the same manner and finally the outer shield 24 is attached to its supporting flange. The entire anode header assembly is then inserted into the tubular portion 1 of the envelope and welded in vacuum-tight relation to provide a completely unitary device which may be evacuated and sealed off, if desired.

This construction provides a converter valve, the envelope of which is completely rigid, while having the necessary vacuum tightness and having the necessary mechanical support for maintaining the internal electrodes in fixed relation to each other and to the envelope in spite of excessive vibration or shock.

While, for purposes of illustration, we have shown and described a specific embodiment of our invention, it will be apparent that changes and modifications can be made therein without departing from the true spirit of our invention or the scope of the appended claims.

We claim as our invention:

1. A shock-resisting construction for a vapor electric valve comprising an elongated metal envelope, the top end of said envelope including a header having an opening therein, an anode in said envelope, said anode having a working face shaped as a spherical section, a metallic anode stem attached to said anode and extending through said opening, an insulating bushing rigidly supporting said anode stem with respect to said envelope, an anode shield substantially enclosing said anode and extending along the major portion of the anode stem, means intermediate the ends of said insulating bushing for rigidly supporting said anode shield, a vacuum-proof seal between said envelope and said anode shield and a vacuum-proof seal between said anode shield and said anode stem.

2. A shockproof electric valve comprising a metallic envelope, a header having an opening therein, an anode in said envelope, an anode stem attached to said anode and extending through said opening, a mechanically strong insulator attached to said envelope and the outer extremity of said anode stem, and a resiliently mounted glass-metal vacuum-tight seal between said envelope and said anode stem.

3. A shockproof electric valve comprising a metallic envelope, a header having an opening therein, an anode in said envelope, an anode stem attached to said anode and extending through said opening, a mechanically strong insulator attached to said envelope and the outer extremity of said anode stem, a resiliently mounted glass-metal vacuum-tight seal between said envelope and said anode stem, a plurality of shields about said anode, the inner anode shield extending through the major portion of said anode and said anode stem, said inner shield being mechanically supported intermediate the ends of said insulator.

4. A lead-in assembly for a vapor electric device comprising a substantially cylindrical envelope, a header in said envelope having an opening therein, an electrode in said envelope, a rigid supporting connection for said electrode, said connection extending through said opening, a bushing including a body portion of a composition of mica and glass with metal end portions embedded therein, one of said end portions being welded to said header about said opening, another of said end portions being welded to said connection, a shield having a tubular portion enclosing the major portion of said connection, a vacuum-proof insulating seal between said header and said shield and a second vacuum-proof insulating seal between said connection and said shield.

5. A lead-in assembly for a vapor electric device comprising a substantially cylindrical envelope, a header in said envelope having an opening therein, an electrode in said envelope, a rigid supporting connection for said electrode, said connection extending through said opening, a bushing including a body portion of a composition of mica and glass with metal end portions embedded therein, one of said end portions being welded to said header about said opening, another of said end portions being welded to said connection, a shield having a tubular portion enclosing the major portion of said connection, a vacuum-proof insulating seal between said header and said shield and a second vacuum-proof insulating seal between said connection and said shield, and a filling of electronegative gas in the space between the bushing and the vacuum-proof insulating seal.

6. In a vapor electric device having a metallic envelope enclosing a plurality of electrodes, an anode, an anode stem secured to said anode, a rigid insulating bushing secured to said stem and said envelope to rigidly support said anode in relation to said envelope, an electrode closely surrounding said anode and said anode stem, means intermediate the ends of said rigid insulating bushing for rigidly mounting said electrode, a second electrode closely enclosing said first mentioned electrode, insulating means for rigidly mounting said second electrode on said envelope.

7. In a vapor electric device having a metallic envelope enclosing a plurality of electrodes, an anode, an anode stem secured to said anode, a rigid insulating bushing secured to said stem and said envelope to rigidly support said anode in relation to said envelope, an electrode closely surrounding said anode and said anode stem, means intermediate the ends of said rigid insulating bushing for rigidly mounting said electrode, a second electrode closely enclosing said first mentioned electrode, insulating means for rigidly mounting said second electrode on said envelope, and a resilient vacuum-proof insulating seal between said envelope and said anode stem.

8. In a vapor electric device having a metallic envelope enclosing a plurality of electrodes, an anode, an anode stem secured to said anode, a rigid insulating bushing secured to said stem and said envelope to rigidly support said anode in relation to said envelope, an electrode closely surrounding said anode and said anode stem, means intermediate the ends of said rigid insulating bushing for rigidly mounting said electrode, a second electrode closely enclosing said first mentioned electrode, insulating means for rigidly mounting said second electrode on said envelope, a resilient vacuum-proof insulating seal between said envelope and said anode stem, and a filling fluid having a high electrical breakdown between said rigid insulating bushing and said vacuum-proof insulating seal.

9. In a vapor electric device having a metallic envelope enclosing a plurality of electrodes, an anode, an anode stem secured to said anode, a rigid insulating bushing secured to said stem and said envelope to rigidly support said anode in relation to said envelope, an electrode closely surrounding said anode and said anode stem, means intermediate the ends of said rigid insulating bushing for rigidly mounting said electrode, a second electrode closely enclosing said first mentioned electrode, insulating means for rigidly mounting said second electrode on said envelope, a resilient vacuum-proof insulating seal between said envelope and said anode stem, and spaced apart mounting means for rigidly supporting said metallic envelope.

MAX GARBUNY.
ROBERT E. HULL.

No references cited.